Aug. 24, 1954   J. C. GRAYUM   2,687,042
MERCURY GAUGE
Filed May 9, 1952
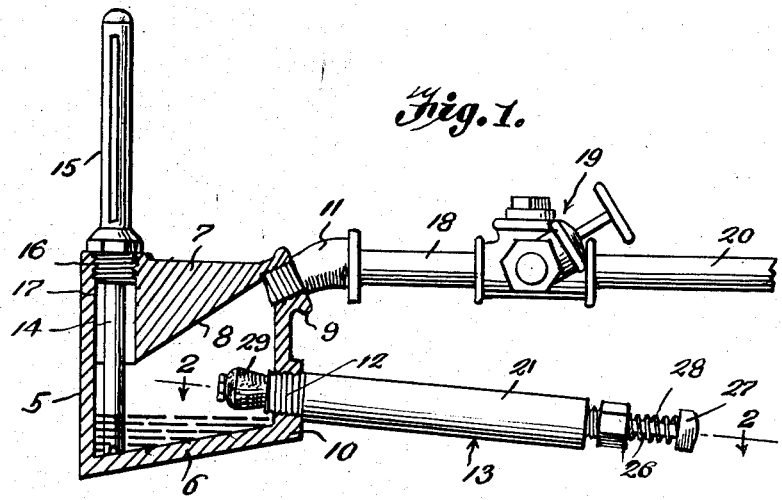
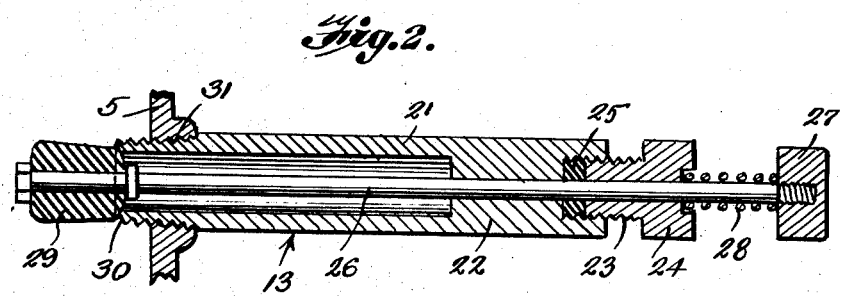
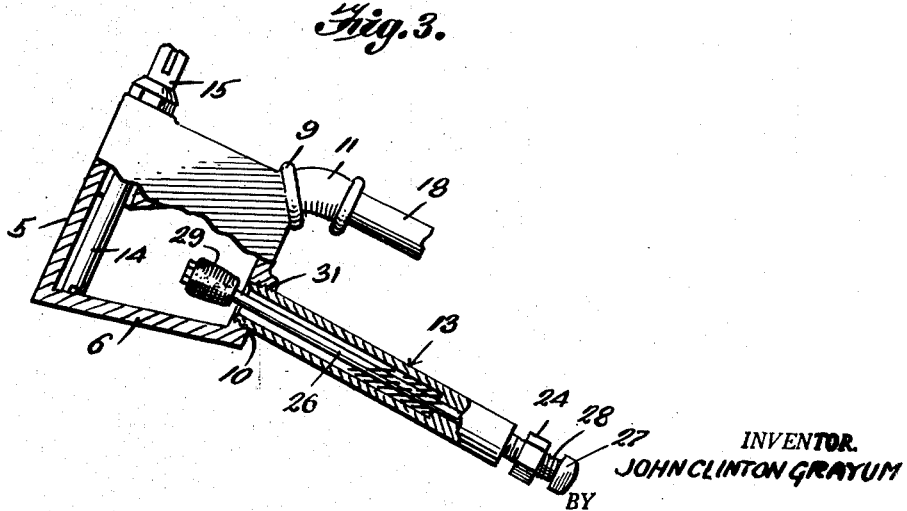
INVENTOR.
JOHN CLINTON GRAYUM
BY
Patrick D. Beavers
ATTORNEY Patented Aug. 24, 1954

2,687,042

UNITED STATES PATENT OFFICE 2,687,042

MERCURY GAUGE

John C. Grayum, Houston, Tex.

Application May 9, 1952, Serial No. 286,950

1 Claim. (Cl. 73—401)

The present invention relates to improvements in mercury gauges and the principal object is to provide a gauge of this type especially adapted for use in finding leaks in gas and air lines.

Another important object of the invention is to provide a mercury gauge for the purpose stated which includes novel mercury trap means, the purpose of which is to prevent the spilling of mercury when the gauge is not in use.

The present application is predicated on abandoned application Serial No. 2,770, filed on January 16, 1948, and allowed on March 1, 1950.

Other objects and advantages of the invention will become apparent to the reader of the following description.

In the drawing:

Figure 1 is a fragmentary side elevational view showing part of the gauge in vertical section.

Figure 2 is a fragmentary enlarged sectional view taken on line 2—2 of Figure 1.

Figure 3 is a fragmentary sectional and side elevational view showing the gauge tilted and the trap valve in opened position.

Referring to the drawings wherein like numerals designate like parts, it can be seen, that numeral 5 denotes a pot having a sloping bottom 6 and a thickened top portion 7 having a sloping inner side 8, sloping in the same direction as the bottom 6 but at a greater angle. Upper and lower portions of the pot 5 are of thick construction as at 9 and 10 and have threaded openings for receiving the threads of an elbow 11 and the threads 12 of a trap structure generally referred to by numeral 13.

Numeral 14 denotes a mercury tube which extends to the sloping bottom 6 and has entrance openings for mercury so that mercury can be forced up into the tube by the pressure of the line being tested.

Numeral 15 denotes a slotted protector shell for the upper portion of the tube 14 and this has a threaded portion 16 at its lower end for threaded disposition into the upper end of a bore 17 formed in the thickened top 7 of the pot 5, as is clearly shown in Figure 1.

The elbow 11 has a short pipe section 18 extending therefrom and connecting to a shut-off valve generally referred to by numeral 19. This valve is connectible to a pipe line 20 to be tested.

The mercury trap 13 consists of a barrel 21, this barrel being solid at one end as at 22 and at this end formed with a threaded opening for receiving the threaded shank 23 of a nut 24, which can be screwed against a graphite packing 25.

A rod 26 extends longitudinally through the barrel 21, through the solid portion 22 and also through the nut 24. The nut 24 end of the rod 26 has a knob 27 thereon and between this knob and the nut 24 and convoluted on the rod 26 is a compression spring 28.

The other end of the rod 26 is provided with a resilient plug 29 of tapered construction and the inner end of this is seatable against a concaved seat 30 at the adjacent end of the barrel 21. It can be seen that the barrel is reduced as at 31 and has the threads 12 which are disposed into the thickened portion 10 of the pot 5.

In the use and operation of this gauge, and before the same is connected to the line 20 to be tested, the gauge is tilted to a position opposite from that shown in Figure 3, so that by pushing inwardly on the knob 27, the valve plug 29 will be displaced and mercury previously trapped in the barrel 21 allowed to flow into the pot 5. The knob 27 is now released and the valve plug 29 returns to seated position so that the mercury cannot return to the trap 13.

The shut-off valve 19 is now connected to the line 20 and the valve 19 is opened. Pressure from the line 20 will then move the mercury in the pot 5 into the column tube 14, which is of course graduated and the graduations visible through the slot in the protector shell 15.

When the test has been completed, the gauge is disconnected from the line 20.

The gauge is now tilted to the position shown in Figure 3 and the knob 27 forced inwardly. This allows the mercury to run into the trap 13 and when all of the mercury has come to rest in the barrel 21, the knob 27 is released and the spring 28 will pull the valve plug 29 to the closed position shown in Figure 2. The mercury is held in the trap 13 when the gauge is not in use.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

A mercury gauge comprising a mercury receiving pot, a gauge column extending from the pot, a valved fitting for connection with a line to be tested and a trap for receiving mercury from the pot and holding the same therein while the gauge is not in use, said trap being composed of an elongated barrel having one end connected to and in communication with the pot, a rod extending longitudinally through the barrel, a valve element at the pot end of the rod, a knob at the other end of the rod and exteriorly of the barrel and a spring on the rod at the knob end thereof for normally holding the rod moved outwardly and the valve element engaged against the adjacent end of the barrel.

References Cited in the file of this patent

UNITED STATES PATENTS

| Number | Name | Date |
|---|---|---|
| 913,010 | Hohmann | Feb. 23, 1909 |
| 1,027,834 | Fulmer | May 28, 1912 |